May 23, 1944.    G. HERZOG ET AL    2,349,429
METHOD AND APPARATUS FOR MEASURING THICKNESS
Filed April 29, 1942    2 Sheets-Sheet 1

GERHARD HERZOG
JAMES S. STEIN
INVENTORS

BY R. J. Dearborn

THEIR ATTORNEY

May 23, 1944.　　　G. HERZOG ET AL　　　2,349,429
METHOD AND APPARATUS FOR MEASURING THICKNESS
Filed April 29, 1942　　　2 Sheets-Sheet 2

GERHARD HERZOG
JAMES S. STEIN
INVENTORS

BY R.J. Dearborn
THEIR ATTORNEY

Patented May 23, 1944

2,349,429

UNITED STATES PATENT OFFICE 2,349,429

METHOD AND APPARATUS FOR MEASURING THICKNESS

Gerhard Herzog, Houston, Tex., and James Henry Stein, Elmhurst, N. Y., assignors to Texaco Development Corporation, New York, N. Y., a corporation of Delaware Application April 29, 1942, Serial No. 440,900

10 Claims. (Cl. 250—83.6)

This invention relates to the measurement of wall thickness and more particularly to a method and an apparatus for measuring the thickness or variations in thickness of the walls of objects such as heat exchanger tubing, still shells and the like. The principal object of the invention is to provide a method and an apparatus by means of which the thickness of a wall may be determined from one side thereof and in a rapid and convenient manner.

It frequently is desirable to measure the thickness of tubing and containers which are accessible from one side only. In certain industries, such as oil refining, it is desirable, if not essential, to measure the thickness of walls of tubes and containers at frequent intervals so as to detect any undue corrosion or pitting which might weaken structure. Obviously, if the wall of a heat exchanger tube carrying an inflammable fluid should become sufficiently corroded it would crack or break and a disastrous explosion or fire might result.

Various mechanical devices have been used in the past for measuring or calipering the inside diameters of still tubes but it is not infrequent that the hole is not concentric with respect to the outside of the tube, and therefore even though the inside diameter is measured and found to be normal this is no definite indication that one side of the tube is not thinner than another side. In the periodic checking of the thickness of tube walls it is common practice to remove the tubes from the tube bank and then to drill small holes at spaced intervals throughout the length of a tube so that a calipering device can be inserted to measure the actual thickness of the tube wall at the point where the small hole is drilled. These holes must subsequently be plugged, as by welding, and the tube replaced in the bank. This is obviously an expensive and time-consuming operation.

A very satisfactory method of measuring the thickness of a tube wall from one side is disclosed in the U. S. Letters Patent No. 2,277,756 granted to D. G. C. Hare March 31, 1942. In that patent a method is disclosed utilizing the scattering effect of penetrative radiation such as gamma rays. A beam of radiation is caused to enter the tube wall from one side, and a detector placed near the source and on the same side of the tube wall measures the amount of radiation scattered in the material of the tube wall and returned to the detector. Since the amount of returned, scattered radiation is a function of the amount of material in the wall, the thickness of the tube wall can be measured quickly and accurately. However, the use of this scattering method is limited by the thickness of the material to be measured and this limiting thickness is reached when the increased scattered radiation due to an increase in wall thickness is compensated by the loss of primary and scattered radiation due to absorption. Again, this scattering method is not always satisfactory when measuring the thickness of the walls of return bends or other fittings which are curved or irregular in shape.

It is well known that the absorption of gamma rays and X-rays which pass through material affords a means of determining the amount of material traversed. This method is highly sensitive since the absorption follows an exponential law with the thickness of the absorbing material. However, in its simplest form such an arrangement would require access to the wall to be measured on both sides since the beam of radiation must pass from a source at one side through the wall to a detecting device at the other side.

In accordance with the present invention this method of measuring the amount of radiation transmitted through a wall, or conversely the amount of the radiation absorbed by the wall, is utilized in a geometric arrangement such that the determination of thickness may be made entirely from one side of a curved wall. In measuring the thickness of the wall of a tube, a source of radiation and a radiation detector are placed in such relation to the tube to be measured that a beam of the radiation will pass tangentially through the wall from the source to the detector. The detector which is responsive to the intensity of the transmitted beam of radiation may be connected through a suitable amplifier to an indicating or recording device which when properly calibrated will provide a direct measurement of the thickness of the tube wall through which the beam of radiation is passed.

For a better understanding of the invention reference may be had to the accompanying drawings in which.

Figure 1:
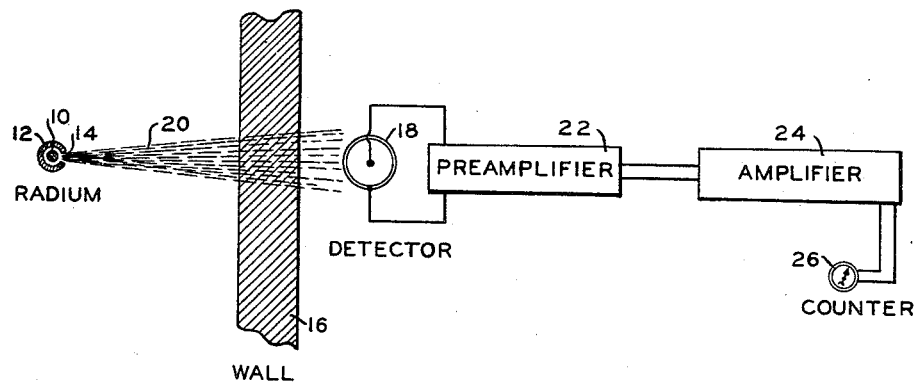
Figure 1 is a somewhat diagrammatic illustration of the measurement of the thickness of a wall by the direct transmission method.

Referring to the drawings, the basic principle of the transmission method is shown in Figure 1. A source 10 of penetrative radiation, such as radium or a radium compound, which source is preferably disposed within a shield 12 containing an opening 14, is placed at one side of a plate or body 16 the thickness of which it is desired to measure and on the other side of the plate opposite the source a radiation detector 18 is disposed so as to be in the path of the rays 20. The detector 18 is preferably connected through a pre-amplifier 22 and an amplifier 24 to an indicating or recording device such as a counter 26. Gamma rays 28 from the source 10 pass through the wall or plate 16 and the intensity of the emergent beam is then measured by means of the device 26 which receives the response of the radiation detector 18. The device 18 may be any suitable radiation detector such as an ionization chamber or a Geiger-Muller counter. Part of the radiation will be absorbed within the wall 16, the amount absorbed being dependent upon the thickness of the wall, and the greater the thickness of the wall the smaller will be the response of the detector. With proper calibration of the device 26 a measurement may be had of the thickness of the wall. The arrangement shown in Figure 1 requires accessibility of the wall from two sides.

Figure 2:
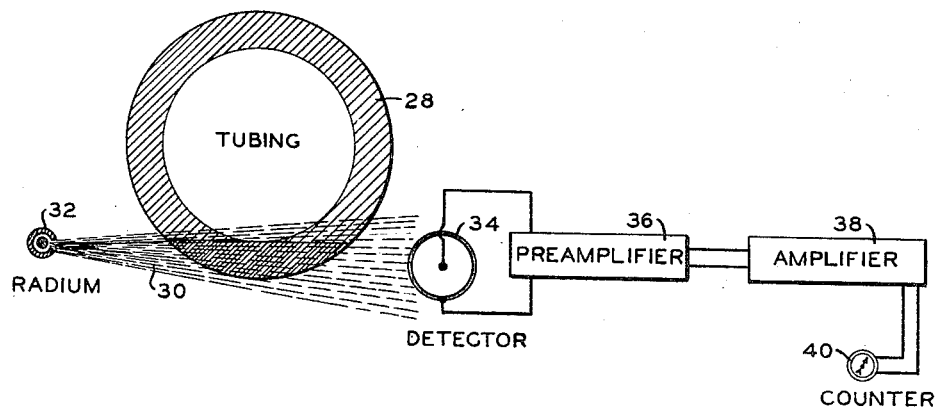
Figure 2 is a similar illustration showing the measurement of the wall of a tube by passing a beam of radiation tangentially through the wall in accordance with this invention.

In Figure 2 a different geometric arrangement is disclosed showing a method and means for measuring the thickness of the wall 28 of a tube or pipe. With this arrangement it is not necessary to have access to both sides of the wall. As is described in reference to Figure 1, a beam of radiation 30 from a source 32 is adapted to pass to a detector 34 connected through a suitable pre-amplifier 36 and an amplifier 38 to an indicating or recording device 40. The source of radiation and the detector are disposed with relation to the wall 28 so that the gamma rays will pass tangentially through the wall and their intensity is measured by the device 40. The intensity of the beam which falls on the detector 34 depends upon the amount of material traversed and this material is cross-hatched in the figure. For a given outside diameter of the tube or pipe the amount of absorbing material will depend only on the thickness of the wall 28 in a well defined mathematical way. The cross-hatched section increases with the wall thickness and hence the response of the detector will decrease.

Figure 3:
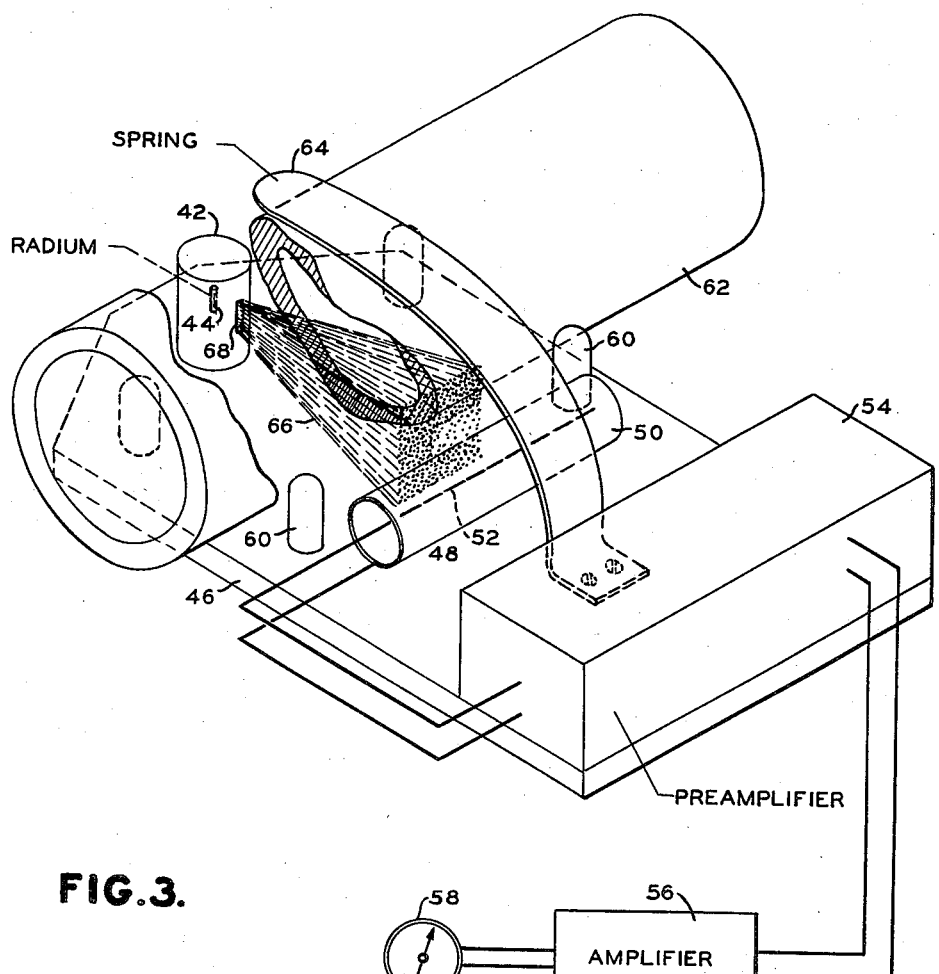
Figure 3 is a somewhat diagrammatic sectional view showing a device for use in measuring the thickness of the wall of a section of tubing.

In Figure 3 an apparatus is shown which has been used to measure the wall thickness of such objects as heater tube return bends. A shield block 42 preferably of lead containing a source of radiation 44 is mounted on a suitable base member 46 and a radiation detector 48 shown as being of the ionization chamber or Geiger-Muller type 50 comprising a cathode 50 and an anode 52 is also mounted on the base member. The detector 50 is connected to a suitable pre-amplifier 54 and this in turn is connected to an amplifier 56, the output of which passes to an indicating or recording device such as a counter 58. Mounted on the base 46 are a plurality of feet or contact members 60 which are spaced so as to engage rigidly a section of a tube 62 or other object, the thickness of the wall of which it is desired to measure. A spring member 64 shown as attached to the base 46 serves to hold the base 46 rigidly to the tube 62. A beam of radiation 66 passes from the source 44 through a slit 68 and then through a tangential section of the tube 62 to the detector 50. The gamma rays are measured by means of the detector 50, the electrical output from which is amplified in the pre-amplifier 54 and then fed to the final amplifier 56 from which it is registered by means of the device 58. It will be seen that with the arrangement of Figure 3 a rugged device has been provided which may be quickly attached to the tubular member, the thickness of the wall of which it is desired to ascertain.

It is understood that the tube 62 will be turned around its longitudinal axis so that measurements may be made of a plurality of tangential sections in the same transverse plane. If the tube 62 cannot be turned the base member 46 and the associated equipment can be moved around the tube, the legs or contact points 60 being maintained in contact with the outer surface of the tube. In case it is desired to measure the walls of tubes having different diameters, the legs 60 will be adjusted to fit the tubes so that a tangential section will be in the path of the radiation 66.

Figure 4:
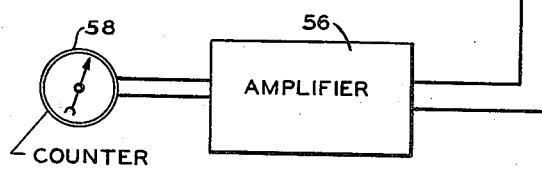
Figure 4 is a calibration curve.
Figure 4:
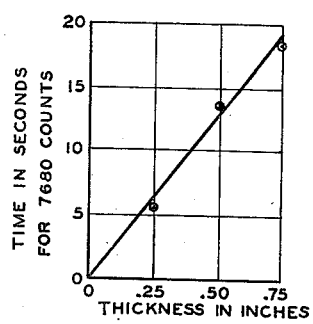

In Figure 4 a calibration curve is given which was made up from sections of tubing all 5" in outside diameter but having various wall thicknesses. The wall thickness is plotted on the abscissa while the ordinates indicate the time for the occurrence of 7680 counts. It will be noted that the graph is almost linear and shows that the transmission method has the same sensitivity in the counter response independent of the wall thickness.

As has been stated hereinbefore, the arrangements shown in Figures 2 and 3 have an advantage over the device disclosed in the aforementioned Hare Patent No. 2,277,756 in that with the device shown, for instance, in the present Figure 3, measurements may be made where the thickness of the wall of the tube 62 is considerably greater than would be possible with the device described in the patent. Another advantage of the absorption or transmission method resides in the fact that the primary beam 66 has a much greater intensity than the scattered radiation utilized in the Hare patent. Therefore, with the same amount of radium greater thicknesses may be measured with the transmission or absorption method and likewise a smaller radium source will be sufficient to measure the same thickness.

Obviously many modifications and variations of the invention, as hereinbefore set forth, may be made without departing from the spirit and scope thereof, but only such limitations should be imposed as are indicated in the appended claims.

We claim:

1. The method of measuring the thickness of the wall of a curved object such as a still tube, still shell or the like which comprises directing a beam of penetrative radiation tangentially through a section of the wall and determining the amount of the radiation transmitted through the section.

2. The method of measuring the thickness of the wall of a cylindrical object such as a still tube or the like which comprises passing a beam of penetrative radiation through a section of the wall in a tangential direction and determining the amount of the radiation absorbed in the wall section.

3. The method of measuring the thickness of the wall of a cylindrical object such as a still tube or shell which comprises directing a beam of penetrative radiation tangentially through a section of the wall from a source placed near the outer surface of the wall, and determining the amount of radiation transmitted through the wall to a detector placed near the outer surface of the wall tangentially opposite said source.

4. The method of measuring variations in the thickness of the wall of a cylinder which comprises directing a beam of penetrative radiation into a tangential section of the wall, determining the amount of the radiation transmitted through the tangential section and repeating the operation as the cylinder is turned about its longitudinal axis.

5. The method of measuring the thickness of the wall of a cylinder which comprises directing a beam of penetrative radiation tangentially into the wall; determining the amount of the radiation transmitted through the wall to the tangentially opposite side and repeating the operation at other points around the cylinder in the same transverse plane.

6. The method of measuring the thickness of the wall of a cylindrical object such as a still tube or shell or the like which comprises directing a beam of penetrative radiation into a tangential section of the wall from a source placed near the outer surface of the wall, determining the amount of radiation transmitted through the wall to a detector placed near the outer surface of the wall tangentially opposite said source, and repeating the operation at other tangential sections in a plane substantially perpendicular to the longitudinal axis of the cylindrical object.

7. The method of measuring the thickness of the wall of a uniformly curved object which comprises directing a beam of penetrative radiation into a plurality of tangential portions of the object in substantially the same transverse plane, and measuring variations in the amounts of radiation transmitted through said tangential portions.

8. A device for measuring the thickness of a uniformly curved wall comprising a base member, a source of penetrative radiation mounted on said member, a detector of transmitted radiation also mounted on said member and means for positioning said base member near one side of said wall with said source and said detector tangentially opposite each other so that radiation from said source will pass to said detector through a tangential portion of said wall.

9. A device for measuring the thickness of the wall of a tubular object comprising a base member, a source of penetrative radiation mounted on said member, a detector of transmitted radiation also mounted on said member, collimating means for directing a beam of said radiation from said source to said detector, and means for supporting one side of said tubular object so that said beam will pass tangentially through the wall of the object from the source to the detector.

10. A device for measuring the thickness of the wall of a tubular object comprising a base member, a source of penetrative radiation mounted on said member, a detector of transmitted radiation also mounted on said member, a plurality of supporting feet on said member between said source and said detector so as to engage said object to support said object, source and detector in rigid relation with the source and the detector opposite a tangential portion of said object.

GERHARD HERZOG.
JAMES HENRY STEIN.